United States Patent [19]
Loerop

[11] 3,809,141
[45] May 7, 1974

[54] VENTILATOR AND SIMULATED STRUCTURE PANEL

[76] Inventor: Jack C. Loerop, 5129 Lawn Ave., Western Springs, Ill. 60558

[22] Filed: Jan. 26, 1972

[21] Appl. No.: 220,783

[52] U.S. Cl. .................................................. 160/89
[51] Int. Cl. .............................................. E06b 3/32
[58] Field of Search ............................... 160/89–95; 49/64, 67, 87, 88, 90, 501, 504, 505, DIG. 2; 98/37, 110, 114; 52/306, 307, 308, 309, 316, 616

[56] References Cited
UNITED STATES PATENTS

| | | | |
|---|---|---|---|
| 2,366,339 | 1/1945 | Kump, Jr. | 49/64 |
| 2,823,773 | 2/1958 | Kubatzky et al. | 160/92 |
| 2,844,998 | 7/1958 | Vincent | 52/306 |
| 2,877,841 | 3/1959 | Grabove | 49/64 |
| 3,189,339 | 6/1965 | Siciliano | 49/87 |
| 3,387,421 | 6/1968 | Robertson | 52/616 |
| 3,534,800 | 10/1970 | Guttman | 160/92 |
| 3,568,387 | 3/1971 | Grabow | 52/316 |

Primary Examiner—Peter M. Caun

[57] ABSTRACT

A ventilator formed from molded parts and a simulated structural panel formed from molded parts, said ventilator and panel used in combination or separately. The panel has four molded frame parts with integrally formed structures to support a screen, a window pane, a louver assembly, and a roller for opening and closing the louver assembly. The frame parts have integrally formed interlocking members for joining and bonding the frame parts together. The louver assembly includes a plurality of louver members with integrally formed brackets which are pivoted to the side frame parts and to common links, one of which common link is operated by the roller to open and close the louver members. Molded split stem pivot shafts are used for the roller and louver assembly. Other integrally formed parts on the molded frame part are provided to tilt the window pane in open position, to provide rigidity, and interlocking of the frame parts, to provide interior and exterior flanges for the ventilator, and to provide other features of advantage in the substantially all plastic ventilator.

14 Claims, 29 Drawing Figures

3,809,141

PATENTED MAY 7 1974

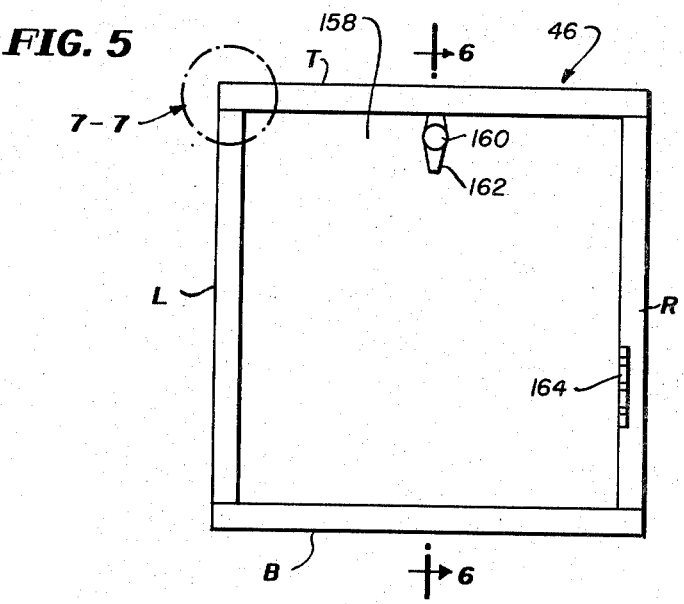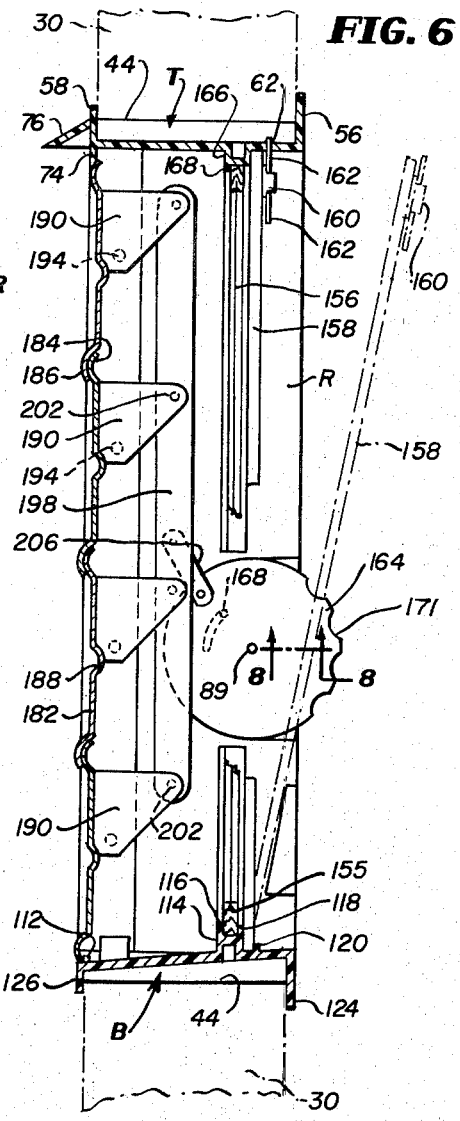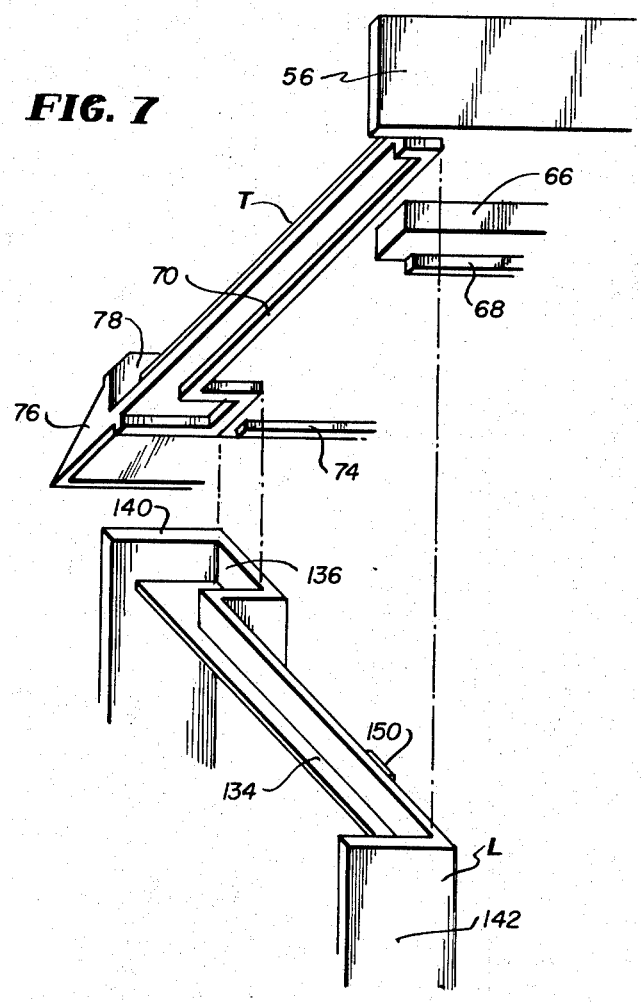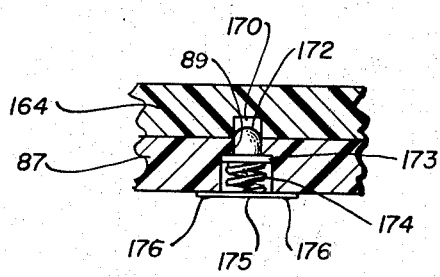

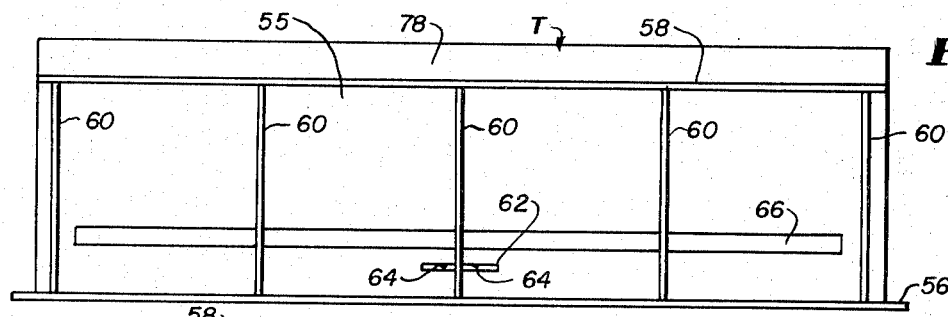
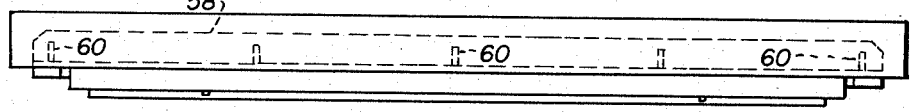
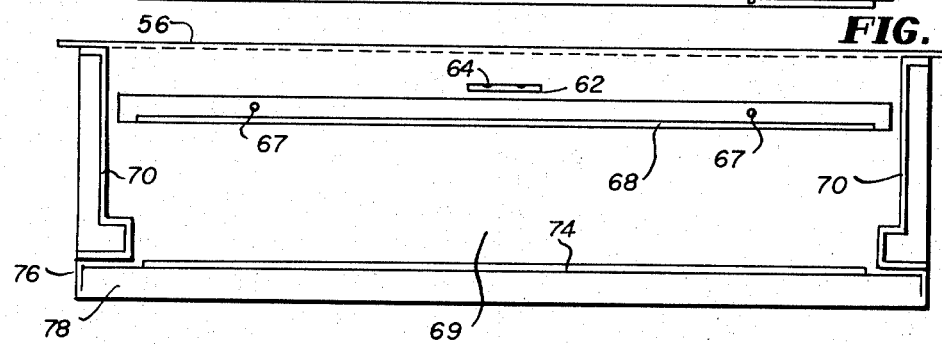
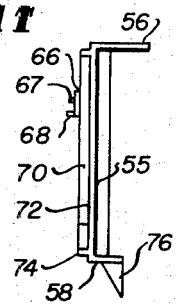
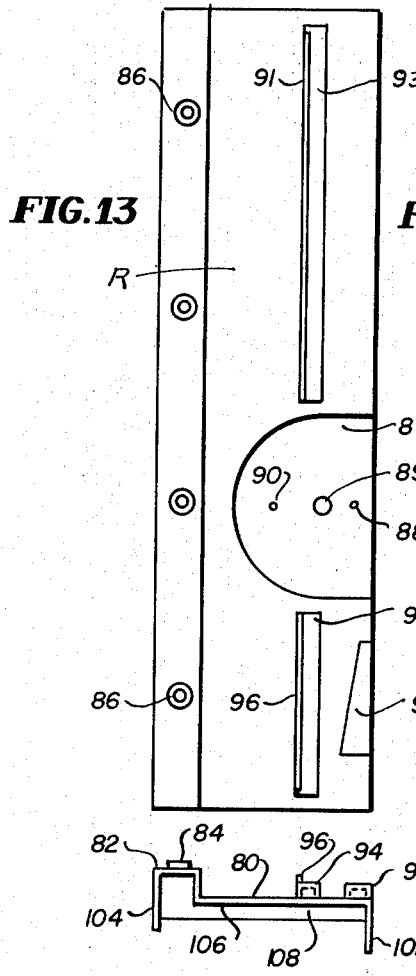
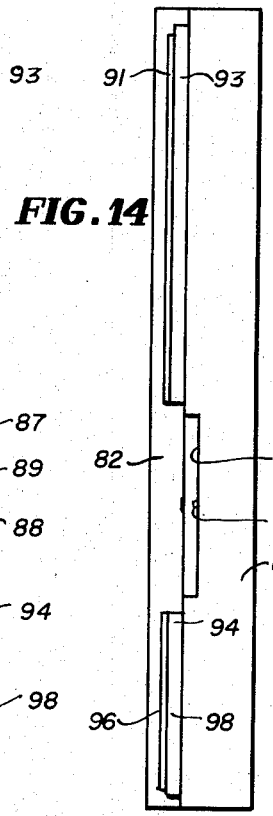
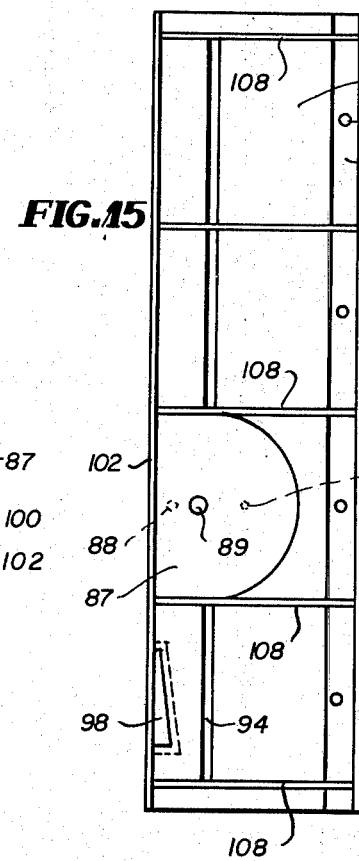
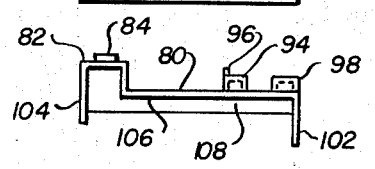

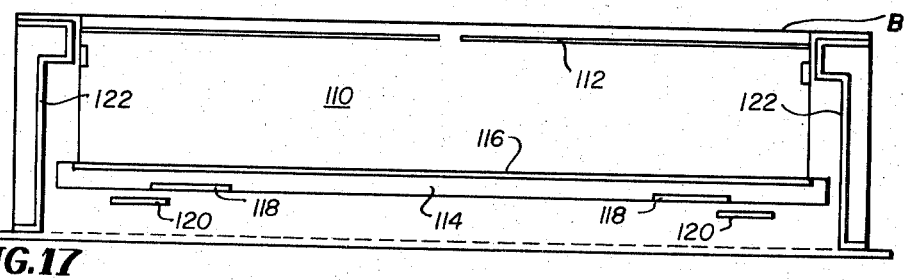
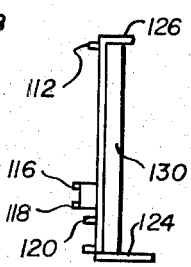
FIG.17                     FIG. 20
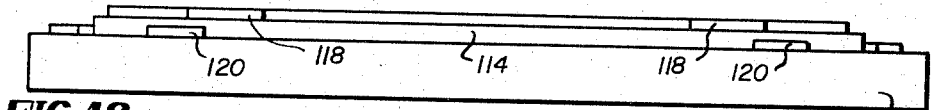
FIG.18
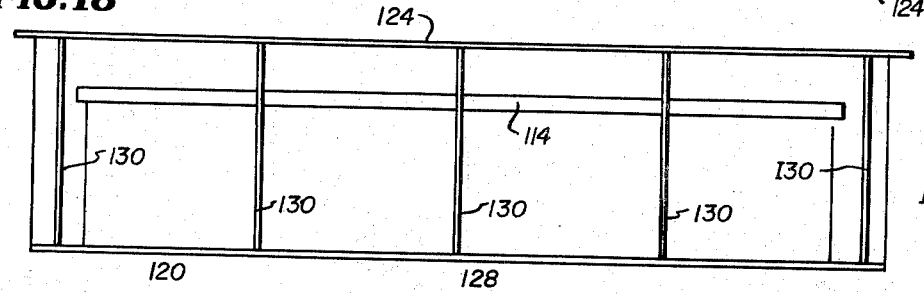
FIG. 19
FIG.21       FIG.22       FIG.23
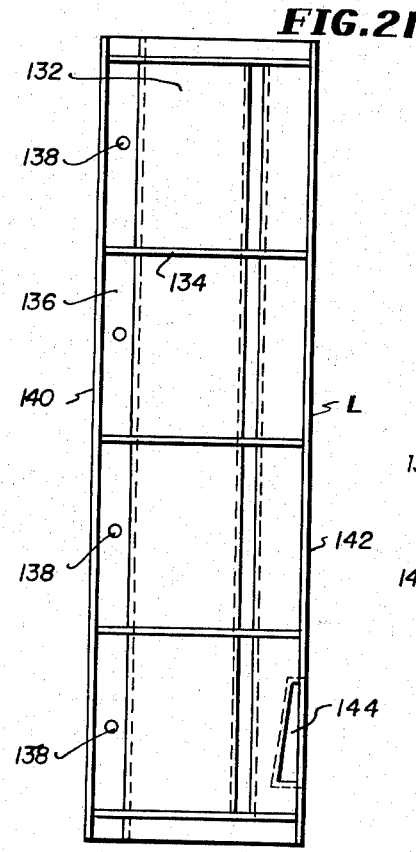
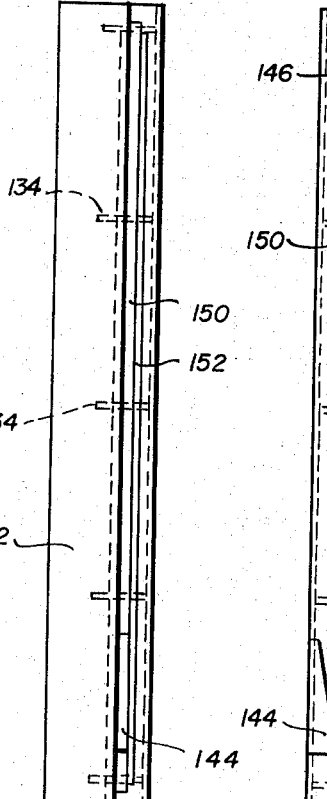
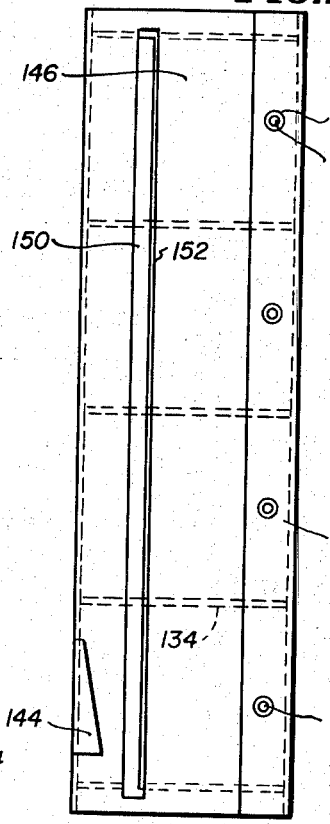
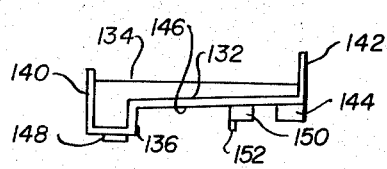
FIG. 24

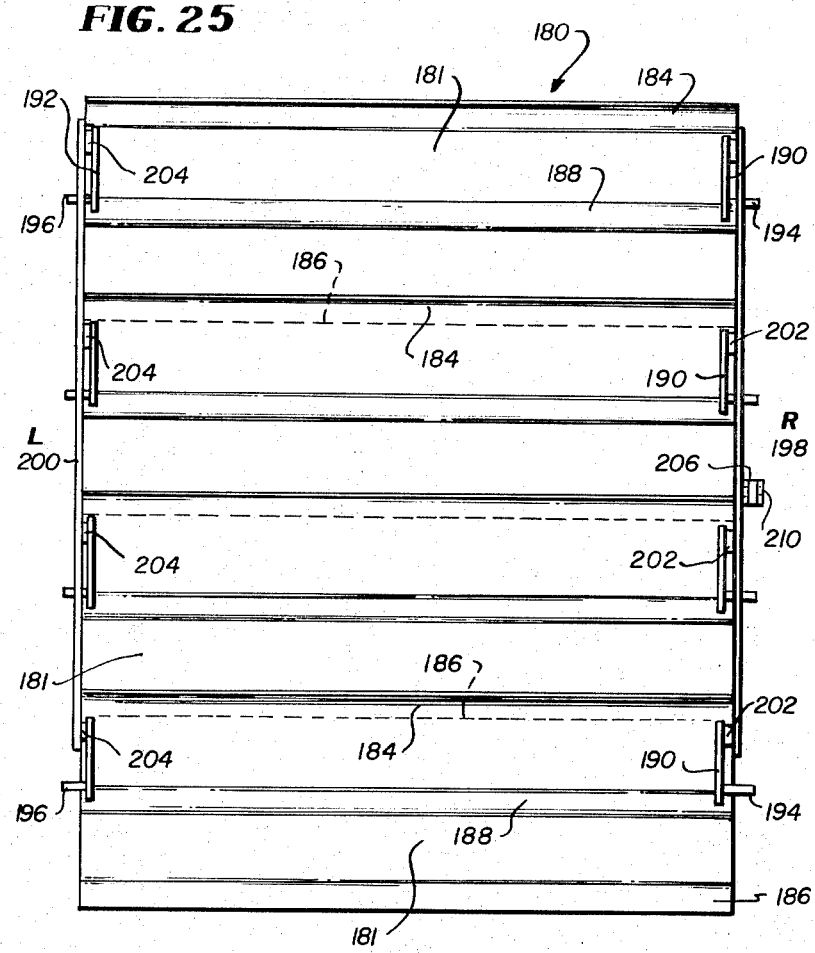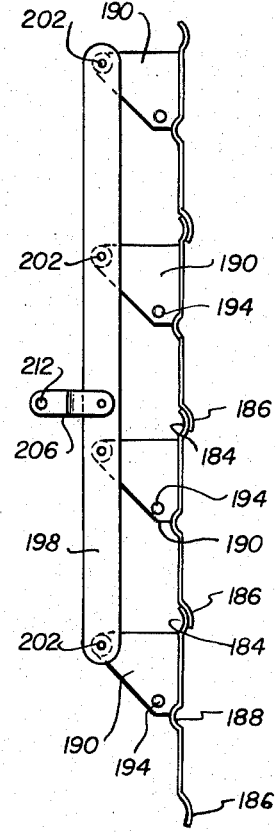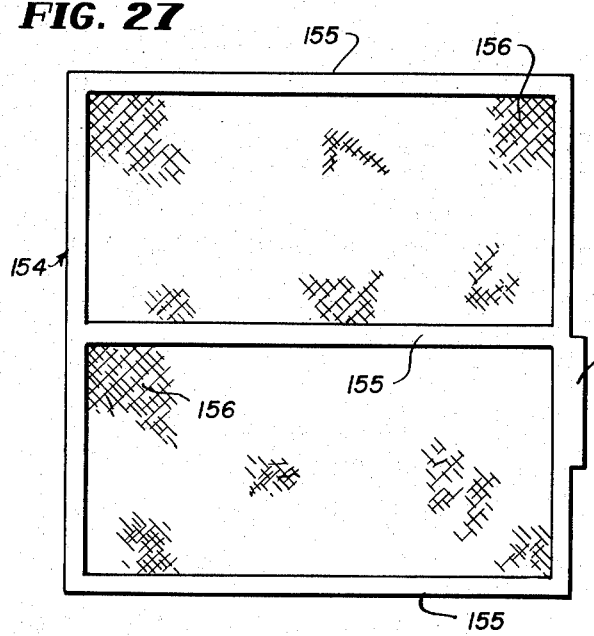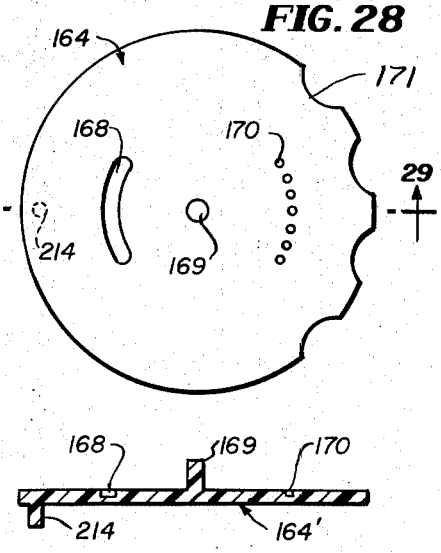

VENTILATOR AND SIMULATED STRUCTURE PANEL

This invention relates to a ventilator mounted in openings of walls or the like, which ventilator is of improved construction. The invention particularly relates to a ventilator assembled in an improved manner from molded parts so that such ventilator is formed substantially of plastic material while providing new features and advantages in combination. The invention also refers to plastic simulated structure panels used in conjunction with the ventilator or alone, such panels being provided with a central opening when used together with a ventilator.

Ventilators are commonly employed as preformed assemblies in construction work. Such ventilators commonly are provided with louver assemblies which commonly have frosted glass as the louver members. It is also conventional to construct such ventilators from metal frame members, generally having a crank mechanism to operate the louvers. Such ventilators may be provided with means for mounting screens thereon for temperate weather conditions. Such screens have to be stored until ready for use, and a window pane element is generally removed and replaced by such screen. In turn, the window pane element must be stored until it is again to be used.

It is readily recognized that conventional ventilators of the foregoing type involve materials which have serious cost aspects, as well as involving workmanship and labor which adds to the overall cost of the ventilator. The crank mechanism which is usually employed in opening and closing the louvers generally involves a gear train which extends somewhat the time required to fully open or close such louvers, as well as increasing the cost of the ventilator as such. Mounting such ventilators in openings in wall structures or the like also requires extra efforts to mount and seal the ventilator within the opening. This generally involves the use of mortar or the like. It is common to mount such ventilators in an area formed by assembling by masonry a number of glass bricks. It will be appreciated that careful attention must be directed to fixing the height, width, and thickness dimensions of the ventilator relative to the possible dimensions of the central opening when using glass bricks of various standard sizes. The same problems are attendant when using other masonry building blocks in forming a well structure providing a central opening for a ventilator. It is understood that such specialized aesthetic structures of glass bricks or the like represent a substantial cost of construction.

One important object of the present invention is to provide an improved ventilator which can be manufactured in an economically advantageous way by molding parts of the ventilator and assembling such parts quickly to attain a substantially all plastic ventilator.

Another important object of the present invention is to provide an improved substantially all plastic ventilator including a molded louver assembly which is opened and closed quickly and reliably by simple manual actuation means.

Still another important object of the present invention is to provide a substantially all plastic ventilator unit which has self-storing and sel-contained window pane and screen members, even when the window pane is moved to open, ventilating position.

Yet still another important object of the present invention is to provide a substantially all plastic ventilator unit having four frame parts separately molded with complementary interlocking features so that top and bottom frame parts may be advantageously interlocked and bonded, if desired, to side frame parts to obtain a substantially rigid frame structure which desirably holds up for extended periods in various structure assemblies.

Yet another important object of the present invention is to provide a substantially all plastic ventilator unit including various pivots for operating the louver assembly, all of which have molded pivot shafts which are securely seated in pivot passageways without requiring independent or separate fastening means.

Another still important object of the present invention is to provide an improved substantially all plastic ventilator unit in which a movable window pane of plastic is moved to closed and open positions while remaining a part of the ventilator assembly, and which window pane has molded latch and pivot means mounted thereon to lock said window pane in closed position to a molded frame part.

Another important object of the present invention is to provide an improved ventilator unit, of the type described, which can be used together with an improved simulated structural molded panel having a central opening therein for mounting the ventilator.

A still another important object of the present invention is to provide an improved ventilator, of the type described, with a molded simulated structural panel which is efficiently and economically formed from two face parts having aesthetically pleasing structural appearance, such face parts bonded together to form an assembled panel unit with a central opening for receiving a ventilator, of the type described, so that ventilator and panel can be utilized in various structural assemblies.

A still yet another important object of the present invention is to provide an improved ventilator, of the type described, used in combination with a simulated molded panel wherein opposite face parts simulate a plurality of glass bricks in configuration and appearance.

Another important object of the present invention is to provide a molded, simulated structural panel, of the type described, with or without a central opening for receiving a ventilator, such panel simulating a variety of aesthetically pleasing faces on building blocks, particularly glass building blocks.

The foregoing objects are now attained by the invention which will be described, and still other objects will be attained which will occur to practitioners from time to time by the disclosure of this same invention, including drawings, wherein:

FIG. 5 is a front elevational view of the ventilator unit as seen from the interior of a building;

FIG. 6 is a cross sectional view taken along line 6—6 of FIG. 5, on an enlarged scale;

FIG. 7 is an exploded perspective view of the corner frame construction of the ventilator unit taken in the proximity of line 7—7 of FIG. 5, on an enlarged scale;

FIG. 8 is a cross sectional view taken along line 8—8 of FIG. 6 showing a selector locking assembly for variable opening of the louver members, on an enlarged scale;

FIG. 9 is a top plan view of the top frame member of the ventilator unit;

FIG. 10 is a front elevational view of the top plane member shown in FIG. 9;

FIG. 11 is a bottom plan view of the top frame member shown in FIG. 9;

FIG. 12 is a side elevational view of the top plan members shown in FIG. 11;

FIG. 13 is an inside side elevational view of the right side frame member of the ventilator unit as seen from the interior of the building;

FIG. 14 is a front elevational view of the side frame member shown in FIG. 13;

FIG. 15 is an outside side elevational view of the side frame part shown in FIG. 13;

FIG. 16 is an end elevational view of the side frame part shown in FIG. 13;

FIG. 17 is a plan view of the inside of the bottom frame part of the ventilator unit;

FIG. 18 is a front elevational view of the bottom frame part of FIG. 17;

FIG. 19 is a plan view of the outside of the bottom frame part of FIG. 17;

FIG. 20 is an end elevational view of the bottom frame part of FIG. 17;

FIG. 21 is an outside side elevational view of the left side frame member as used on the interior of a building;

FIG. 22 is an inside side elevational view of the side frame part of FIG. 21;

FIG. 23 is an inside side elevational view of the side frame part of FIG. 21;

FIG. 24 is an end elevational view of the side frame part of FIG. 21;

FIG. 25 is a side elevational view of the louver assembly viewed from the interior of a building;

FIG. 26 is a side elevational view of the louver assembly of FIG. 25;

FIG. 27 is a side elevational view of the screen member which is stored in place in the ventilator unit;

FIG. 28 is a side elevational view, on an enlarged scale, of a roller used to actuate opening and closing of the louver members; and FIG. 29 is a sectional view along line 29—29 of Figure.

Use of the same numerals in the various views of the drawings will indicate a reference of the same structures, parts, or elements, as the case may be.

Figure 1:
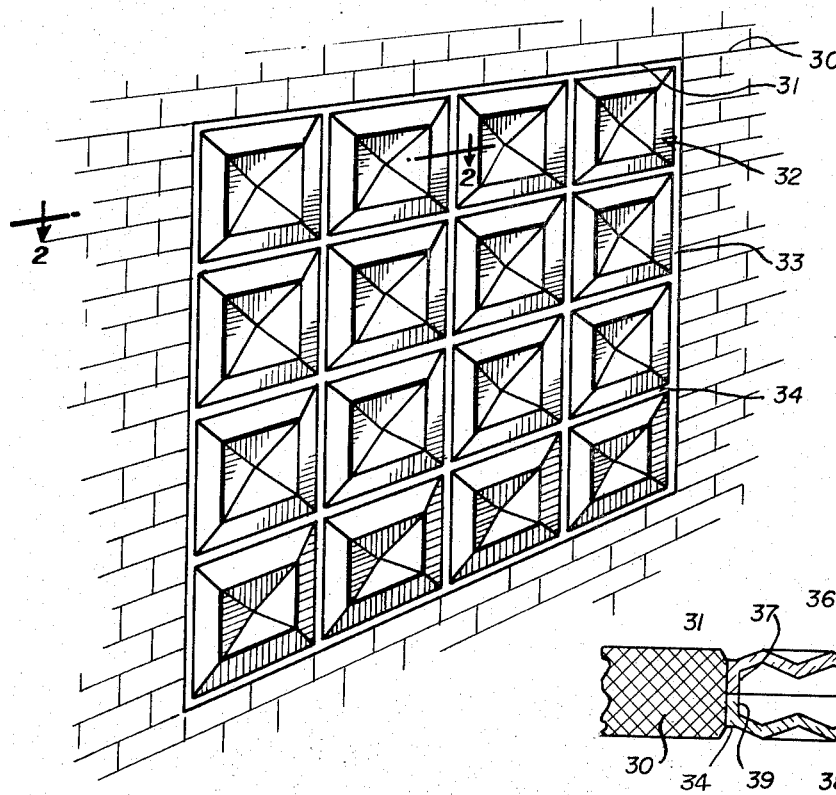
FIG. 1 is a perspective view showing a simulated structural molded panel used as a decorative building area.
Figure 2:
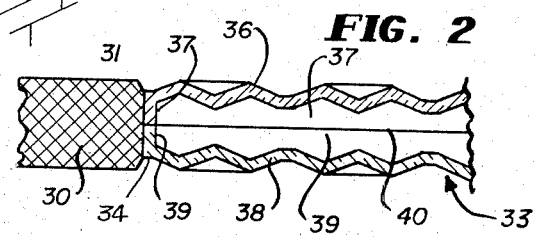
FIG. 2 is a cross sectional view taken along line 2—2 of FIG. 1, showing a two part assembly of the simulated structural panel.

In brief summary, the invention provides a substantially all plastic ventilator unit comprising four separately molded frame parts bonded and interlocked together to provide a substantially continuous rectangular frame configuration. The frame stores and contains a screen member held in place by stops which are integrally formed on the molded frame parts. Such a screen is mounted on a substantially continuous screen support in integrally formed on the molded frame parts. The exterior of the ventilator unit is described in relation to the exterior of the building and is on one side of the screen and support; amd the interior of the ventilator unit is described in relationship to the interior of a building, and is on the other side of the screen member and screen support. The ventilator unit also contains a window pane member which is held partly by integrally formed parts on a molded frame part, and latched to an upper frame part by latch means mounted on the window pane. A louver assembly is mounted on the exterior side of the ventilator unit, and is quickly opened and closed by a roller rotatably mounted to a side frame part and interconnected to the louver assembly by a connecting link. The pivot means of the louver assembly and rotatable rollers are provided by integrally formed pivot shafts molded with different parts of the ventilator unit.

The term "unit" is used to describe the ventilator, and it should be understood that the ventilator is assembled or packaged as a unit, even though it comprises some separable components. The substantially all plastic ventilator unit may be mounted in a central opening of a molded structural panel formed from two opposite face parts. The simulated structural panel is preferably made to simulate in configuration and appearance structural glass blocks assembled by mortar.

Referring now to the drawings, FIGS. 1–4 illustrate a structure such as a wall 30 provided with a central opening or an aperture 31. A simulated structure panel shown generally as 32 is mounted within the opening 31. The panel is intended to illustrate a simulated assembly of glass building blocks each of which is a four-sided polygon such as shown at 33, each of which is bordered by narrow planer areas 34 intended to simulate mortar. The simulated structural panel is formed from two opposed face parts, one face part 36 having continuous sides extending in substantial normal relationship to a plane which intersects the various angles of the face 36. One of such sides is shown as 37. The opposed face 38 of the two part panel also has similar continuous sides, one of which is shown at 39. The free edges of the continuous sides 37, 39 are bonded to each other along a junction line 40. It is seen that the assembled and bonded face parts simulate a panel having a face to face dimension substantially equal to the thickness of the wall 30 which defines the opening 31.

Figure 3:
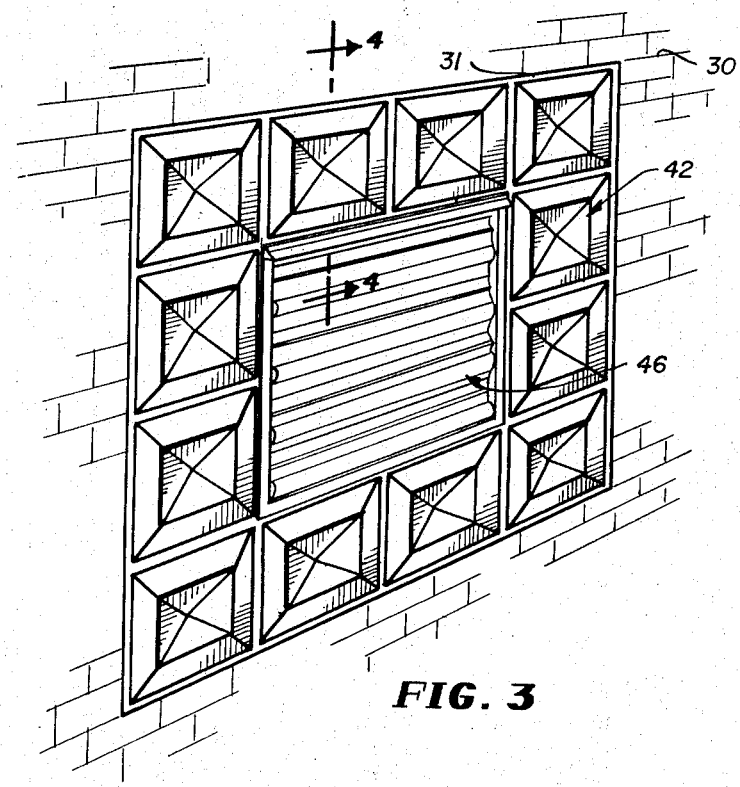
FIG. 3 is a perspective view showing a simulated structural panel having a centrally located opening with a ventilator unit mounted therein.
Figure 4:
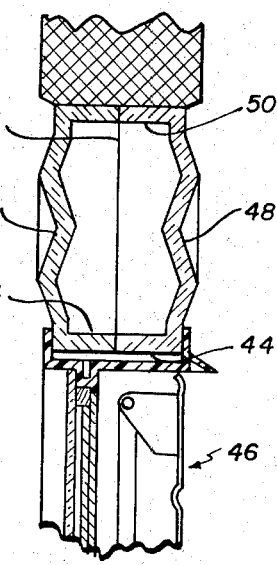
FIG. 4 is a sectional view taken along line 4—4 of FIG. 3 shown on an enlarged scale.

Looking now at FIGS. 3 and 4, a simulated glass brick panel frame 42 is provided with a central opening 44 in which is mounted a ventilator unit shown generally at 46. The panel 42, in like manner, is provided with a face part 48 having continuous sides 50, and an opposed face part 52 having continuous sides 54, the free edges of the respective sides being bonded together along a junction line 53. The plurality of four-sided polygons are intended to individually simulate glass bricks in configuration and appearance by molding techniques well known in the art. Each face part of the panel may be conventionally formed by vacuum molding using a first mold part and a second mold "helper" with ribs to help define the narrow planer area intended to simulate mortar.

Referring now to FIG. 5, the ventilator unit has four separately molded frame parts which, when viewed from the interior of the building, are identified to have a separately molded top frame part T, a separately molded bottom frame part B, a separately molded left side part L, and a separately molded right side frame part, R. The assembled frame parts of the ventilator unit may each be viewed as having an inside surface contiguous with the area formed by the frame parts, and an outside surface which is opposite to the inside surface.

The detailed description of the various frame parts which follow may be better understood by referring periodically to FIG. 7 and, particularly, FIG. 6. Looking first at the top frame part shown in FIGS. 9–12, there is seen the outside body surface 55 which has an integrally formed interior top flange 56 and a smaller exterior flange 58. The outside has a plurality of integrally formed cross ribs 44 extending between flanges 56, 58. The top frame part has a locking slot 62 provided with friction buttons 64 to engage a locking latch, as will be later described.

The inside of the top frame part has an elongated top screen support in the form of an angle having one side 66 to support the screen from being displaced toward the exterior of the ventilator. A pair of screen pin holders 67 are shown on side 66 spaced from side 68 a distance sufficient to accomodate the thickness of a screen frame member, to be later described.

The inside surface 69 of the top frame part has a pair of angle ribs 70 at each end. The angle ribs serve as interlocking members with the side frame parts, as will be later described. The inside surface 69 is also provided with an integrally formed elongated louver stop 74 which is exterior to the elongated screen support. Gussets 76 form a web which merges exterior flange 58 with exterior margin 78 of the top frame part.

The right side frame part is now described in relationship to the views of FIGS. 13–16. The inside body surface 80 follows an angular configuration defined, in part, by projecting lateral arm 82. The inside surface of the lateral arm has a plurality of mounting bosses 84, each of which is provided with a mounting bore 86.

The inside body surface 80 has a recessed portion or roller seat 87. The recessed portion has a roller locking detent 88 for holding the roller in variable operating positions which will be later described. The recess portion also has a shaft passageway 89 for mounting the roller. A roller detent pin 90 is in the recess portion to limit the rotation of the roller positioned in the roller seat.

The inside body surface 80 is also provided with an elongated angle screen support integrally formed in two parts, on each side of a gap in which recess portion 87 is located. The upper angle screen support has sides 90 that support the screen against the side frame part, and a stop 91 to prevent displacement of the screen member toward the exterior of the ventilator. In like manner, lower angle or screen support has side 94 and stop 96.

The inside body surface is also provided with integrally formed inclined stop 98 proximate to the end of the side frame which adjoins the bottom frame part. The inclined stop operates as a window pane stop to hold the window pane in tilted and open position as indicated in phantom in the view of FIG. 6.

The right side frame part has an interior side flange 102, and a smaller exterior side flange 104. Such flanges extend beyond outside body surface 106 and are substantially parallel to one another as shown. A plurality of integrally formed reinforcing cross ribs 108 extend between the flanges 102, 104, as shown.

The bottom frame part is shown in detail in the views of FIGS. 17–20. The inside body surface 110 has an elongated bottom louver stop 112 on the exterior side of the screen support. The inside surface also is provided with an elongated screen support, or angle having side 114 to support the screen and side 116 to prevent displacement of the screen toward the exterior of the ventilator. Side 114 has a pair of screen supports 118 which are spaced from side 116 a distance substantially equal to the thickness of the screen frame member. The inside body surface also has window pane holders 120 spaced from side 114 of the screen support angle a distance which is about equal to the thickness of the window pane member.

The inside body surface of the bottom frame member also has an angled bottom locking rib 122 at each opposite end.

A larger interior flange 124 and the smaller exterior flange 126 extend beyond outside body surface 128. A plurality of reinforcing cross ribs 130 extend between the exterior and interior flanges as shown. The elongated angle screen support is shown as a recess portion on the outside body surface 128 of the bottom frame part.

The left side frame part is shown in detail in the views of FIGS. 21–24. The outside body surface 132 is shown with a plurality of reinforcing cross ribs 134. The wall configuration is angular as defined in part by lateral arm 136, the recessed portion whereof is shown from the outside of the left side frame part. The lateral arm 136 has a plurality of mounting bores 138. The lateral arm 136 is defined in part by exterior flange 140 which extends beyond outside surface 132. A smaller exterior flange 142 also extends beyond the outside body surface 132. An inclined window pane stop 144 projects relative to inside body surface 146, and is recessed relative to outside body surface 132.

The inside of the left side frame part has a plurality of mounting bosses 148 integrally formed on the projecting lateral arm portion 136. The mounting bosses are provided with the mounting bores 138. The inside surface 146 also has integrally formed elongated screen support, or angle, with side 150 to support the screen frame member and side 152 to prevent displacement toward the exterior of the ventilator.

Looking at FIGS. 6 and 27, the screen frame 154 holds a screen 156. The screen frame is formed from a plurality of frame members 155. The screen frame has an extension 157 which fits into the gap between upper and lower elongated screen supports in the right side frame part.

The window pane 158 is preferably a transparent plastic such as plexiglass. The plexiglass material can have integrally formed thereon a split stem pivot shaft 160. Such a stem is preferably split in two directions, one normal to the other, so that four separable sections are provided (FIG. 5). The separate sections may be compressed together so the split stem may move through a pivot passageway such as mounting bores 86 in right side frame part and mounting bores 138 in left side frame part. Once such stem is moved through the pivot passageway, the sections expand to lock the stem therein without requiring separate fasteners, caps, or the like. A rotatable latch 162, having a central pivot passageway, may then be mounted onto split stem 160.

The latcy may then be rotated to engage slot 62 in the top frame part, see FIGS. 5, 6 and 9.

Considering now FIGS. 6–8 and 28–29, roller 164 is mounted in the roller seat or recessed portion 87 of the right side frame part. The roller has a plurality of finger indents 171 to facilitate rotation. The side of the roller which adjoins the recess portion is also shown as having a cam track or arcuate groove 168 which engages detent 90 in the recessed portion. The cam track and detent limit the rotational travel of the roller 164. The inside of the roller which adjoins the recessed portion also has an adjacent row of catches shown in the form of arcuate locking holes 170. The inside of the roller also is shown with an integrally formed split stem roller shaft 169 which is mounted in pivot passage 89 in the recess portion 87.

The shaft passageway 87 in the recessed portion 87 is formed of communicating passages of different diameters, as shown. A bullet detent 172 is positioned in the smaller diameter passage, and such bullet has a fixed flange 173 which is in the large diameter passageway. A spring 144 biases the bullet towards the arcuate locking holes 170. A support plate 175 is fixed to the outside of the recessed portion by fasteners 176, and such plate holds the spring 174 under compression to urge bullet 172 outwardly.

The louver assembly may be best understood by particular reference to FIGS. 6 and 25–26. The louver assembly is shown generally as 180, and it includes a plurality of louver members 181. Each louver member is shown formed with an upper lapping bead 184, a lower lapping bead 186 and an intermediate reverse bead 188. The upper bead 184 forms an interior lap with respect to lower bead 186 which forms an exterior lap. Intermediate reverse bead 188 is provided to prevent bowing of the louver member along its short axis from top to bottom.

Each louver member is or may be molded with integrally formed right brackets 190 and an opposite left bracket 192. The foregoing orientation is made relative to an interior view of the ventilator as seen in FIG. 25. Bracket 190 is preferably formed with an integral pivot shaft 194, and bracket 192 is likewise preferably formed with an integral shaft 196. The opposite sides of the louver assembly have a right elongated common link 198, and an opposite left elongated common link 200. The common links may be molded with integral pivot link shafts 202 on elongated common link 198, and pivot link shafts 204 on elongated common link 200. The link pivot shafts are preferably of the split stem type and engage pivot passageways in the brackets 190, 192. The pivot shafts 194, 196 are also preferably the split stem type and engage the pivot passageways 86, 138 in the side frame parts.

The roller 164 actuates the adjoining common link 198 through a roller or connecting link 206 joined to common link 198 by pivot 208 at one of its ends, said pivot including a split stem shaft 210 integrally formed on molded common link 198. The opposite end of the connecting link 206 is joined to the outside of the roller by pivot 212, which includes integrally formed split stem shaft 214 on the molded rollers (FIG. 29). A hard turn down of roller 164 limits rotational travel by detent 90 moving to the other side of cam track 168. Such a hard turn down turns the connecting link to the position shown in FIG. 26, or even over center. This opens the louver members by moving the common link 198 downwardly as indicated in phantom in the view of FIG. 26. Variable rotational positions, within the limits of the cam track 168, are maintained by the spring biased bullet 172 engaging one of the locking holes 170.

In the preferred embodiment, the interlocking members on the insides of the top and bottom frame parts and at the opposite ends of the side frame parts are bonded together. Looking at FIG. 7, cross ribs immediately adjoining the opposite ends of the side frame parts, such as rib 134 on side frame part L, are positioned below the edges a distance generally equal to the height of the angled locking ribs, such as 70. The male angled ribs, therefore, seat within the female angle wall configuration, and are further bonded to the cross rib on which they are seated.

The claims of the invention are now presented. In terms of which may be additionally understood by reference to the foregoing specification and drawings.

What is claimed:

1. A ventilator, including
   a molded top frame part, a screen support on the inside of said top part,
   a molded bottom frame part, a screen support on the inside of said bottom part,
   first and second molded side frame parts, a screen support in each of said first and second frame parts,
   interlocking members at the top and bottom of said first and second frame parts,
   complementary integrally molded interlocking members on the inside of the top and bottom frame parts, said interlocking members being interlocked and bonded to join the four frame parts and align the respective screen supports, the ventilator exterior being on one side of said aligned screen support and the ventilator interior being on the other side of said aligned screen support,
   a screen mounted on said aligned screen supports,
   a window pane positionable against said screen on the interior side of the ventilator, and movable away therefrom, means to lock said window pane against said screen, and stop means integrally molded on the side frame parts adjacent the bottom frame part to limit tilting movement of the window pane from said screen support,
   a plurality of molded interlocked louvers positioned on the exterior side of the ventilator, a common link interconnecting said plurality of louvers, means mounting said plurality of interlinked louvers to the inside of said first and second frame parts, and
   manual actuating means in one of said frame parts, connected to said common link for moving said link to a first position where the louvers are closed and to a second position where the louvers are fully opened.

2. A ventilator which includes the features of claim 1 wherein said actuating means includes a roller, a recess in one of said frame parts to accommodate said roller, said roller and recess formed in a gap between spaced screen supports formed in said side frame part, a pivot mounting said roller in said recessed portion, and a connecting link pivotally mounted at one end to the roller and at the opposite end to said common link.

3. A ventilator which includes the features of claim 2 wherein the connecting link is pivotally mounted to said roller and said common link that a hard turn to said roller turns the connecting link to hold the plurality of louver members in fully opened position.

4. A ventilator which includes the features of claim 3 above wherein the rotational limits of said roller are controlled by a cam track and detent relatively mounted between said roller and said recess portion.

5. A ventilator which includes the features of claim 4 which further includes an arcuate row of adjoining catches, a detent spring biased towards said row of catches, said catches and detent being relatively positioned in said recessed portion and said roller.

6. A ventilator which includes the features of claim 1, and which further includes a molded bracket member joining each louver member to the common link, a pivot mounting each bracket to the common link, a second pivot mounting each bracket to the adjoining side frame part, and said second pivot including a shaft passing through preformed mounting bores in the molded side frame part.

7. A ventilator which includes the features of claim 6, and which further includes a second common link adjoining the side frame part opposite from the side frame part adjoining the first common link, a bracket joining each louver member to said second common link, a pivot connecting each of said brackets to said second common link, and a second pivot in each of said brackets, including a shaft passing through preformed mounting bores in the molded side frame part adjoining said second common link.

8. A ventilator which includes the features of claim 7, wherein each louver member is a molded substantially flat body member having an upper bead directed toward the top frame part, a lower bead directed toward the bottom frame part, and an intermediate reserve bead to prevent bowing, whereby louver members below the uppermost of the lowermost louver members have their upper bead forming an interior lap with the lower bead of the adjoining upper louver member, and the lower bead forming an exterior lap with the bead of the adjoining lower louver member.

9. A ventilator which includes the features of claim 8, wherein each bracket is molded with integral split stem shafts for said first and second pivots, the split stem shaft of the second pivot being compressed to pass through said mounting bores, whereupon it expands to lock the stem therein, and the split stem shaft of said second pivot being compressed to pass through a hole in said second common links and expanding thereafter to lock the split stem shaft therein.

10. A ventilator which includes the features of claim 1 wherein said movable window pane is transparent plastic having a latch mounted on an upper portion adjoining the top frame part, a catch in said top frame part to be engaged by said latch, said stop means being aligned integral stops on the insides of said first and second molded frame parts, said stops being on the interior side of the ventilator, and said stops having inclined support surfaces, whereby the stops support the window pane in open, tilted position upon release of the latch.

11. A ventilator which includes the features of claim 1 wherein said aligned screen supports are integrally formed elongated angles on the molded frame part, one side of the angle supporting the screen frame member against the frame parts, and the other side of the angle serving as a stop to prevent displacement of the screen towards the exterior of the ventilator.

12. A ventilator which includes the features of claim 1 wherein each of the frame parts includes an integrally formed exterior flange extending on the outsides of the frame parts, and a larger integrally molded interior flange extending to the ouside of each frame part, said flanges forming a continuous exterior and interior flange, said smaller exterior flange permitting the ventilator to be mounted through a structure opening, and said larger interior flange preventing movement of the ventilator through the central opening of the structure.

13. A ventilator which includes the features of claim 1 wherein said interlocking members on the frame parts include angled ribs on the insides of the top and bottom frame parts and said side frame parts having complementary angled wall configurations at the tops and bottoms to receive said angle rib inside said angled wall configurations.

14. A ventilator which includes the features of claim 1, which further includes a molded simulated glass panel having a central opening to receive said ventilator, said panel having two face parts, each face part having continuous sides, the sides of one face part being registered with the sides of the other face part, and said face parts simulating a plurality of glass bricks.

* * * * *